W. WISHART AND A. H. MORRELL.
SCALE TRAP.
APPLICATION FILED SEPT. 8, 1919. RENEWED NOV. 14, 1921.
1,402,821. Patented Jan. 10, 1922.
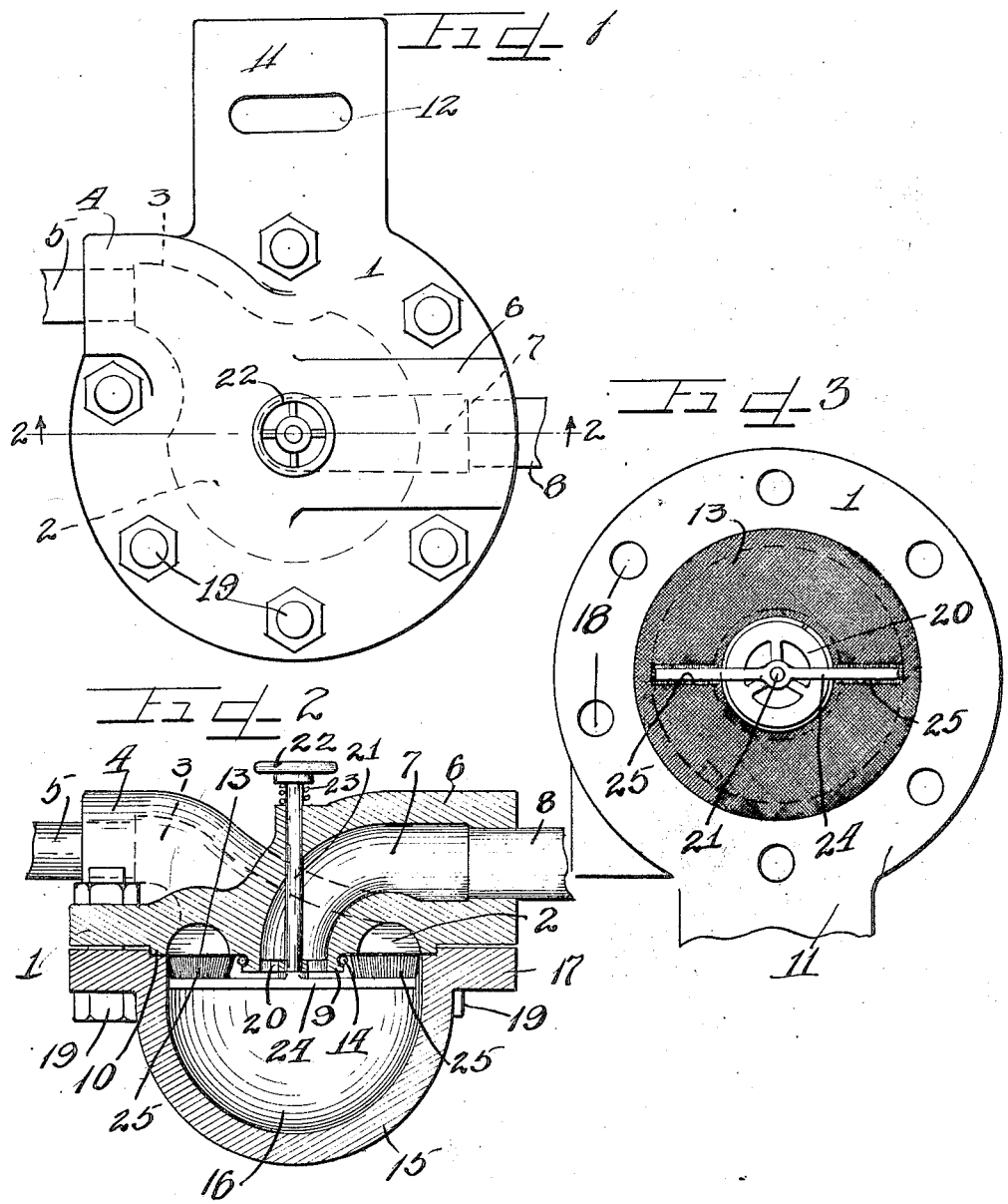

UNITED STATES PATENT OFFICE.

WILLIAM WISHART AND ALBERT H. MORRELL, OF CLINTON, IOWA, ASSIGNORS TO CLINTON REFRIGERATING COMPANY, OF CLINTON, IOWA, A CORPORATION OF IOWA.

SCALE TRAP.

1,402,821.  Specification of Letters Patent.  Patented Jan. 10, 1922.

Application filed September 8, 1919, Serial No. 322,386. Renewed November 14, 1921. Serial No. 515,070.

*To all whom it may concern:*

Be it known that we, WILLIAM WISHART and ALBERT H. MORRELL, citizens of the United States, and residents of the city of Clinton, in the county of Clinton and State of Iowa, have invented certain new and useful Improvements in a Scale Trap; and we do hereby declare that the following is a full, clear, and exact description of the same, reference being had to the accompanying drawings, and to the numerals of reference marked thereon, which form a part of this specification.

This invention relates to an improved type of a scale trap adapted for use in boiler feed systems, in the pipe lines of refrigerating plants and in liquid and gas feed lines in general.

It is an object of this invention to provide a scale trap adapted to be readily cleaned without interrupting the flow of liquid or gas through the trap.

Another object of the invention is the construction of a scale trap wherein an externally operated cleaner is provided within the trap for cleaning a filter screen.

It is also an object of the invention to provide a scale trap with a scale receptacle adapted to be removed for cleaning when filled with sediment and scale.

A further object of this invention is the construction of a trap wherein a pipe union is provided with a rotatable brush mechanism for cleaning the trap filter screen without interfering with the pipe lines or the flow of a liquid or gas therethrough.

It is furthermore an object of the invention to provide a trap wherein a pipe connector is provided with a filter screen retained in position by means of a removable receptacle adapted to receive scale and foreign matter scraped from the screen by a rotatable cleaner.

It is an important object of this invention to provide a scale trap of simple construction adapted to be readily cleaned without interrupting the operation thereof.

Other and further important objects of this invention will be apparent from the disclosures in the specification and drawings.

The invention (in a preferred form) is illustrated in the drawings and hereinafter more fully described.

On the drawings:

Figure 1 is a top plan view of the scale trap embodying the principles of this invention.

Figure 2 is a section taken on line 2—2, of Figure 1, with parts shown in elevation.

Figure 3 is a bottom plan view of the trap with the scale receiving bottom removed.

As shown on the drawings:

The scale trap comprises a connecting plate, body or union 1, made of metal and having a looped outlet chamber 2, formed in the bottom surface thereof. The chamber 2, communicates with an outlet passage 3, provided is a discharge elbow 4, integrally formed on the top of the plate 1, and having one end of an outlet pipe 5, secured in the open end thereof. Also integrally formed on the top of the plate 1, is an inlet elbow 6, provided with an inlet passage 7, having an inlet pipe 8, connected in the outer end thereof. The inner end of the passage 7, is curved downwardly and opens through a collar 9, integrally formed on the middle portion of the bottom surface of the plate 1. The collar 9, is provided with a peripheral groove. A ring or circular flange 10, is integrally formed on the bottom surface of the plate 1, around the chamber 2. A radially projecting arm or bracket 11, is integrally formed on the plate 1, and is provided with a transverse slot 12, to permit the scale trap to be mounted or supported in position.

A circular filter screen 13, is mounted to close the chamber 2. The inner margin of the screen is curled downwardly and is held securely seated in the groove of the collar 9, by a retaining wire or split spring ring 14. The outer margin of the screen 13, is disposed adjacent the circular flange 10, and is held thereagainst by a metal scale receiving receptacle, cup or trap bottom member 15, provided with an entrance chamber 16. A flange rim 17, is integrally formed on the chambered bottom 15, and is provided with a circular groove into which the flange 10, and the outer margin of the screen 13, projects, as shown in Figure 2. The rim 17, of the bottom 15, is provided with a plurality of spaced openings or apertures which are adapted to register with openings or apertures 18, provided in the plate 1, to permit bolts 19, to project through said registering openings to removably hold the bottom 15, attached to the plate 1, thereby holding the filter screen 13, locked in place to separate the liquid or gas inlet chamber 16, from the outlet chamber 2, in the top plate 1, and further permitting the inner end of the inlet passage 7, to communicate directly into the chamber 16.

A screen cleaning mechanism is provided for the trap to permit cleaning of the screen without interrupting the operation of the trap. The cleaning mechanism embraces a centrally apertured spider 20, which is rigidly secured in the inner end of the elbow passage 7, to afford a bearing for the inner end of a shaft or stem 21. The stem 21, is rotatably projected downwardly through a vertical passage in the elbow 6, and through the passage 7, and the middle aperture in the spider 20. A hand wheel 22, is secured on the upper projecting end of the stem 21, for rotating the same. A controlling spring 23, is coiled around the upper end of the stem 21, and has one end seated on the top of the elbow 6, and the upper end contacting the bottom of the hand wheel, for the purpose of normally holding the stem in an elevated position. Rigidly secured on the lower end of the stem 21, below the spider 20, is an arm or bar 24, which extends diametrically across the chamber 16. Securely mounted in the upper surface at each end of the cross arm 24, are a plurality of brush bristles to form a cleaning brush 25. The two brushes 25, are held in engagement with the filter screen 13, by the action of the spring 23, on the stem 21.

The operation is as follows:

With the trap assembled as shown in Figure 2, and connected between the pipes 5 and 8, liquid or gas from the inlet or supply pipe 8, enters the passage 7, of the elbow 6, and flows into the chamber 16, and then upwardly through the filter screen 13, into the chamber 2, and out through the passage 3, and the pipe 5, to the device to be supplied with liquid or gas. Any foreign matter, scales and the like which may be carried by the liquid or gas entering the trap is either deposited in the chamber 16, or adheres to the filter screen 13. The liquid or gas passing through the chamber 2, and into the pipe 5, is thus filtered. When the scales or foreign matter accumulates on the filter screen in such quantities that the flow of liquid or gas from the chamber 16, to the chamber 2, is materially reduced or stopped altogether, the stem 21, of the cleaning mechanism is rotated by means of the hand wheel 22, thereby causing the brush arm 24 to rotate, whereby the brushes 25, sweep over the under surface of the filter screen and loosen and brush the scales and other materials from the screen. The scales and materials removed from the screen, fall into the chamber 16, of the receptacle 15. The above method of brushing the screen to clean the same may be done without any interruption to the flow of liquid or gas through the trap from the pipe 8 to the pipe 5.

Should the chamber 16, become filled with scale and other matter, the flow of liquid or gas from the pipe 8, may be shut off and the bolts 19, removed to permit the removal of the receptacle 15. The scale and other matter accumulated in the receptacle 15, is next removed and the receptacle 15, after washing of the same, is again bolted into position.

The cleaning mechanism within the trap is slidably mounted to remove the brushes out of engagement with the screen when desired, by simply pushing downwardly on the hand wheel 22, against the resistance offered by the spring 23, which is thereby compressed. Release of the hand wheel causes the compressed spring 23, to force the brushes again into engagement with the screen 13.

The filter screen 13, may be removed for cleaning or repairs by removing the receptacle 15, and the retainer ring 14. The slotted arm 11, on the plate 1, permits the trap to be easily supported in position on any suitable support.

We are aware that various details of construction may be varied through a wide range without departing from the principles of this invention, and we therefore do not purpose limiting the patent granted otherwise than necessitated by the prior art.

We claim as our invention:

1. A trap comprising a plate having an open chamber therein, a passaged inlet elbow formed on said plate, a passaged outlet elbow formed on said plate and communicating with said chamber, a filter screen covering said chamber, a chambered bottom removably secured to said plate to hold the screen in place with the chamber thereof communicating with the passaged inlet elbow to permit a liquid to flow from the inlet elbow into the chambered bottom and out through the screen through the plate chamber and said outlet elbow, said screen serving to filter out the scale and other material carried by the entering liquid, and externally operable means in said chambered bottom adapted to be operated to clean the screen without interrupting the operation of the trap.

2. A trap comprising chamber top and bottom members removably connected together, a screen removably clamped between said members to separate the chambers thereof, said top member having inlet and outlet passages therein communicating with the chambers in said bottom member and in said top member respectively, means for cleaning said screen to cause the accumulated deposits thereon to drop into the chamber of said bottom member, and a spring on said means for holding the same in contact with said screen.

In testimony whereof we have hereunto subscribed our names in the presence of two subscribing witnesses.

WILLIAM WISHART.
ALBERT H. MORRELL.

Witnesses:
EARL M. HARDINE,
LE ROY D. KILEY.